United States Patent
Bohori et al.

(10) Patent No.: US 8,441,153 B2
(45) Date of Patent: May 14, 2013

(54) CONTACTLESS POWER TRANSFER SYSTEM

(75) Inventors: Adnan Kutubuddin Bohori, Bangalore (IN); Somakumar Ramachandrapanicker, Bangalore (IN); Christof Martin Sihler, Hallbergmoos (DE); Arvind Kumar Tiwari, Bangalore (IN); Suma Memana Narayana Bhat, Bangalore (IN)

(73) Assignee: General Electric Company, Niskayuna, NY (US)

( * ) Notice: Subject to any disclaimer, the term of this patent is extended or adjusted under 35 U.S.C. 154(b) by 345 days.

(21) Appl. No.: 12/820,208

(22) Filed: Jun. 22, 2010

(65) Prior Publication Data

US 2011/0309687 A1 Dec. 22, 2011

(51) Int. Cl.
*H01F 38/14* (2006.01)

(52) U.S. Cl.
USPC .............................................. 307/104; 307/64

(58) Field of Classification Search .................. 307/104, 307/64
See application file for complete search history.

(56) References Cited

U.S. PATENT DOCUMENTS

| | | | |
|---|---|---|---|
| 3,714,384 A | 1/1973 | Burkhadt et al. | |
| 4,030,058 A | 6/1977 | Riffe et al. | |
| 4,586,767 A | 5/1986 | Benjamin et al. | |
| 4,788,448 A | 11/1988 | Crowe | |
| 5,007,697 A | 4/1991 | Chadha | |
| 5,301,096 A | 4/1994 | Klontz et al. | |
| 6,515,878 B1 * | 2/2003 | Meins et al. | 363/37 |
| 6,960,968 B2 | 11/2005 | Odendaal et al. | |
| 7,083,452 B2 | 8/2006 | Eriksson et al. | |
| 7,186,033 B2 | 3/2007 | Deans | |
| 7,323,964 B1 | 1/2008 | Shyu et al. | |
| 7,355,122 B2 | 4/2008 | Moore | |
| 7,576,447 B2 | 8/2009 | Biester et al. | |
| 7,690,936 B1 | 4/2010 | Snekkevik et al. | |
| 2005/0087339 A1 | 4/2005 | Schultz et al. | |
| 2008/0093922 A1 | 4/2008 | Layton | |
| 2008/0260323 A1 | 10/2008 | Jalali et al. | |
| 2008/0265684 A1 | 10/2008 | Farkas | |
| 2010/0033021 A1 | 2/2010 | Bennett | |

(Continued)

FOREIGN PATENT DOCUMENTS

| | | |
|---|---|---|
| EP | 0433752 A1 | 6/1991 |
| EP | 2151907 A2 | 2/2010 |

(Continued)

OTHER PUBLICATIONS

Search Report from corresponding GB Application No. GB1110347.0 dated Oct. 21, 2011.

(Continued)

*Primary Examiner* — Rexford Barnie
*Assistant Examiner* — Haihui Zhang
(74) *Attorney, Agent, or Firm* — Ann M. Agosti

(57) ABSTRACT

A system comprising a contactless power transfer system is presented. The system includes a primary element, a secondary element, and at least one field-focusing element interposed between the primary element and the secondary element and configured to focus a magnetic field. A partition is disposed between the primary element and the secondary element. The contactless power transfer system is disposed within pressure isolation cavities of a sub-sea assembly and configured to transfer power between a power source and a load.

20 Claims, 4 Drawing Sheets

U.S. PATENT DOCUMENTS

| | | | |
|---|---|---|---|
| 2010/0148589 A1* | 6/2010 | Hamam et al. | 307/104 |
| 2010/0164296 A1 | 7/2010 | Kurs et al. | |
| 2010/0171368 A1* | 7/2010 | Schatz et al. | 307/104 |
| 2010/0181843 A1 | 7/2010 | Schatz et al. | |
| 2011/0234010 A1* | 9/2011 | Bohori et al. | 307/104 |

FOREIGN PATENT DOCUMENTS

| | | |
|---|---|---|
| EP | 2369711 A2 | 9/2011 |
| JP | 2009106136 A | 5/2009 |
| WO | 2007008646 A2 | 1/2007 |
| WO | 2010036980 A1 | 4/2010 |

OTHER PUBLICATIONS

Adnan Bohori et al.; Title : Contactless Power Transfer System; U.S. Appl. No. 12/845,133, filed Apr. 28, 2011; 24 Pages.

Adnan Bohori et al.; Title : Contactless Power Transfer System; U.S. Appl. No. 12/845,133, filed Jul. 28, 2010; 34 Pages.

Adnan Bohori et al.; Title : Power Transfer System and Method; U.S. Appl. No. 12/822,232, filed Jun. 24, 2010; 19 Pages.

Stephen Paul Fenton et al.; Title : Electrical Coupling Apparatus and Method; U.S. Appl. No. 12/778,475, filed May 12, 2010; 12 Pages.

Adnan Bohori et al.; Title : System and Method for Contactless Power Transfer in Portable Image Detectors; U.S. Appl. No. 13/149,170, filed Jun. 24, 2010; 19 Pages.

Adnan Bohori et al.; Title : Systems for Contactless Power Transfer; U.S. Appl. No. 12/914,512, filed Oct. 28, 2010; 17 Pages.

Adnan Bohori et al.; Title : Contactless Power Transfer System and Method; U.S. Appl. No. 12/731,497, filed Mar. 25, 2010; 27 Pages.

Adnan Bohori et al.; Title : System and Method for Contactless Power Transfer in Implatable Devices; U.S. Appl. No. 13/052,196, filed Mar. 21, 2011; 21 Pages.

Aristeidis Karalis, J.D. Joannopoulos, Marin Soljac; Title : Efficient wireless non-radiative mid-range energy transfer; Annals of Physics 323 (2008) 34-48.

Shahrzad Jalali Mazlouman, Alireza Mahanfar, Bozena Kaminska; Title : Mid-range Wireless Energy Transfer Using Inductive Resonance for Wireless Sensors; 6 Pages.

G. Somaschini, SPE, J. Lovell, SPE, H. Abdullah, SPE, B. Chariyev, P. Singh, and F. Arachman, SPE, Schlumberger, ; Abstract : Subsea Deployment of Instrumented Sand Screens in High-Rate Gas Wells; Copyright 2009, Society of Petroleum Engineers; USA, Oct. 4-7, 2009.;1 Page; http://www.spe.org/atce/2009/pages/schedule/documents/spe1250471.pdf.

John Lovell and Stuart Mackay, SPE, Schlumberger.; Permanent reservoir Monitoring in Subsea Wells Attains new Level.; JPT Mar. 2009; pp. 30-33; http://www.slb.com/media/services/resources/articles/completions/200903_jpt_flux.pdf.

* cited by examiner

CONTACTLESS POWER TRANSFER SYSTEM

BACKGROUND

The invention relates generally to contactless power transfer systems and, in particular, to contactless power transfer for subsea applications.

Subsea or other underwater well drilling procedures, such as those used in the oil and gas industry, include use of multiple electrical connections such as, for example, connections between sub-sea distribution units and floating drilling vessels or floating oil platforms. Another example of electrical connection includes coupling between an annular space around a well bore and a tree head within a wellhead to provide power to down hole elements such as sensors. Traditional installation approaches include precisely aligning connections from the tubing hanger to the tree head. Alignment is difficult to achieve in sub-sea environments, particularly in deeper waters and in situations wherein the wellbore is deviated from a vertical position to maximize reservoir penetration into a hydrocarbon bearing structure. Conventional installation approaches additionally involve the use of divers or remotely operated vehicles to effect the physical connection necessary for mechanical connections of electrical contacts between the tubing hanger and the tree and wellheads.

Typically wet-mate connectors are implemented in sub-sea drilling systems to couple two or more elements such as distribution systems, sensors, and electronic modules. Such wet-mate connections require increased isolation from seawater at high pressure while ensuring reliable mating/demating operations. Wet-mate connectors implementing mechanical moving contacts are difficult to control and align in sub-sea environments. Another design for coupling between concentric wellhead elements includes an inductive coupler to transfer an electrical signal across two coils aligned in close proximity. However, such a design is unattractive mechanically due to the two coils occupying a large space. Further, such systems have limited bandwidth and lack efficiency when subjected to larger gaps, load variations, or misalignments.

Thus there is a need for solutions having contactless power transfer that will not require precise alignment and will not require a remote operated vehicle or diver for coupling.

BRIEF DESCRIPTION

Briefly, a system comprising a contactless power transfer system is presented. The system includes a primary element, a secondary element, and at least one field-focusing element interposed between the primary element and the secondary element and configured to focus a magnetic field. A partition is disposed between the primary element and the secondary element. The contactless power transfer system is disposed within pressure isolation cavities of a sub-sea assembly and configured to transfer power between a power source and a load.

In another embodiment, a system comprising a contactless power transfer system is presented. The system includes a primary element, a secondary element and a first field-focusing element disposed proximate the primary element. The system further includes a second field-focusing element disposed proximate the secondary element, the first and second field-focusing elements being configured for operating at two different resonant frequencies to focus a magnetic field and exchange power between the primary element and the secondary element.

In another embodiment, a system comprising a contactless power transfer system is presented. The system includes a power source and a first filter coupled to the primary element and configured to transmit power at a first resonant frequency. The system includes a first converter and a rectifier coupled to the secondary element and configured to deliver power to a load. One or more sensors and second filters are coupled to the secondary element and configured to sense at least one parameter and transmit data at a second resonant frequency. At least two field-focusing elements are interposed between the primary element and the secondary element, a first field-focusing element configured for transmitting power at the first resonant frequency and a second field-focusing element configured for transmitting data at the second resonant frequency. A second converter is coupled to the primary element to receive data from the one or more sensors.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
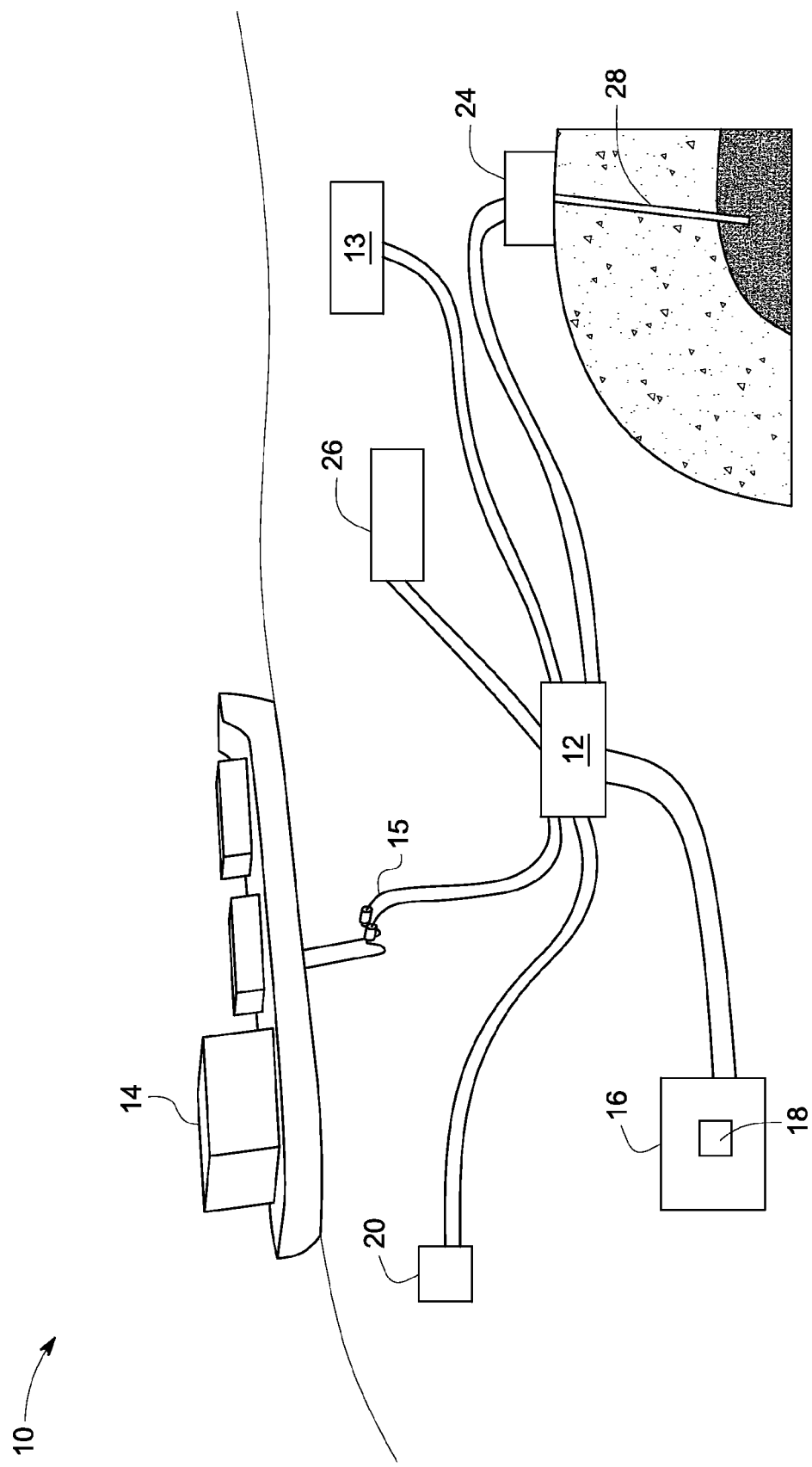
FIG. 1 illustrates a sub-sea drilling system according to an embodiment of the invention.

FIG. 1 illustrates a sub-sea drilling system according to an embodiment of the invention. The sub-sea drilling system 10 includes various systems and sub-systems interconnected underwater and to systems onshore. Sub-sea production systems may include multiple satellite wells with flow lines coupled to, for example, a sub-sea distribution unit 12 that is in turn coupled to a master control station 14 that is hosted for example on a floating drilling vessel or floating oil platform. The phrase "coupled to" refers to any form of interaction between two or more entities, including mechanical, electrical, magnetic, electromagnetic, fluid, and thermal interaction. Two components may be coupled to each other even though they are not in direct contact with each other.

Wellhead systems 16, 24, 26 at the surface of each satellite well on the sea-bed provide the structural and pressure containing interface for the drilling and production equipment. Each wellhead system typically hosts a sub-sea control module 18. Sub-sea distribution unit 12 is configured to control the flow lines between each satellite well and the master control station 14. A remote operator workstation 20 may include, in one embodiment, remotely operated vehicles to assist in the drilling and production.

Concentric components 28, such as well-bores, tubing hangers, and tree heads are disposed beneath each wellhead system 24. During production, oil and gas is transported from beneath the sea-bed via a well-bore at high pressure and temperature. The primary function of a wellhead system is to control the flow of oil and/or gas into or out of the well. The wellhead system may further provide additional features such as ports for injecting chemicals, well intervention elements for wet and dry mate connections, pressure relief elements such as annulus vents, sensors for monitoring the tree and well for parameters such as pressure, temperature, corrosion, erosion, sand detection, flow rate, flow composition, valve and choke position feedback, and connection points for devices such as down hole pressure and temperature transducers. A termination cord 15 from the master control station 14 terminates at the sub-sea distribution unit 12 with a dry-mate connection. Multiple electrical coupling connections between the sub-sea distribution unit 12 and the satellite wellhead systems 16, 24, 26 typically include wet-mate connections on both ends. For example, for each wellhead system in one embodiment, one wet-mate connection is on the sub-sea distribution unit 12, and one wet-mate connection is on the respective wellhead system. In various embodiments of the invention, contactless power transfer systems are provided for such wet-mate connections.

As used herein, "dry-mate connection" refers to a connection that is done onshore prior to being positioned sub-sea. As used herein, "wet-mate connection" refers to a connection done under sea. In one example, wet-mate connections are achieved with the help of remotely operated vehicles (ROVs).

Figure 2:
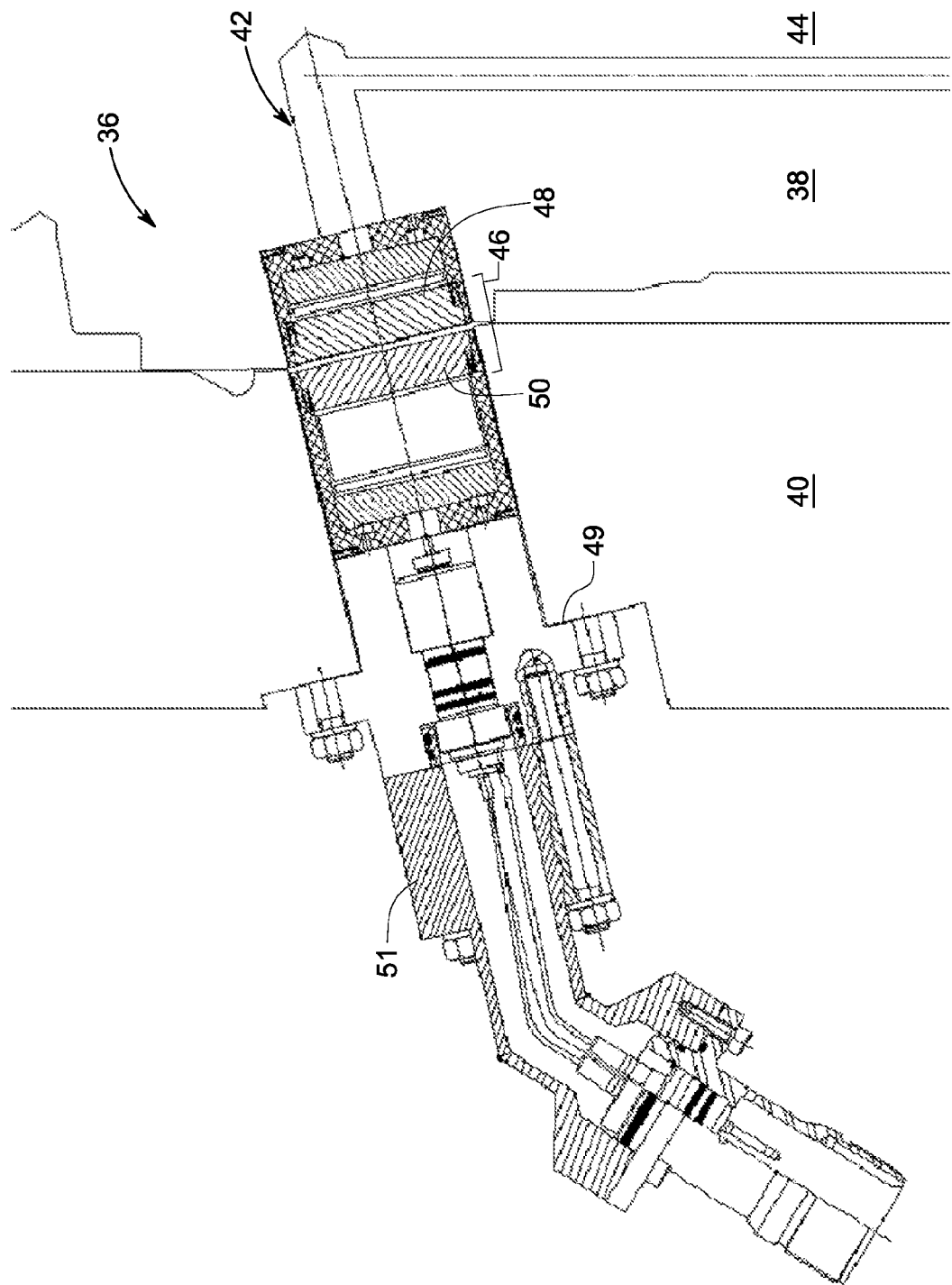
FIG. 2 illustrates a cross-sectional view of concentric components within a wellhead system.
Figure 3:
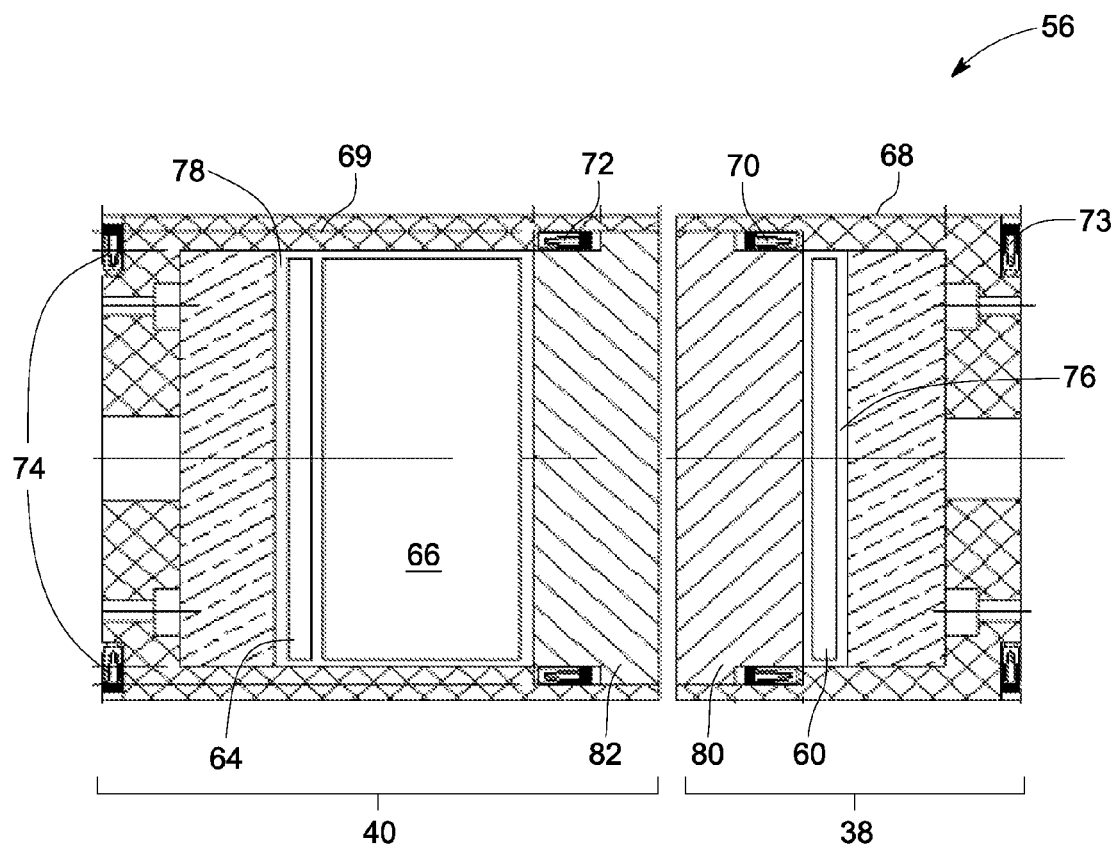
FIG. 3 illustrates a detailed view of a contactless power transfer system according to an embodiment of the invention.

Referring to FIGS. 2 and 3, contactless power transfer system 56 may be implemented where a wet-mate connection is required in sub-sea drilling system 10 of FIG. 1. Referring in particular to FIG. 2, a cross-sectional view of concentric components within a wellhead system is illustrated. The reference numeral 36 illustrates a portion of the first component 38 shown for purposes of example as comprising a tubing hanger that is concentrically disposed within a second component 40 shown for purposes of example as comprising a tree head. Also, for purposes of example, FIG. 2 depicts a portion of the tubing hanger 38 wherein electrical connections 42 are tapped from the well-bore 44 into the tree head 40. A power coupling system 46 comprises at least a first power coupling unit 48 disposed on the first component 38 and a second power coupling unit 50 disposed on the second component 40. As discussed earlier, the electrical connections coupled to the first power coupling unit may originate from devices such as down hole pressure and temperature transducers within the well-bore. A connection flange 49 is coupled to the tree head and configured to provide a dry mate connection 51 to facilitate electrical coupling with the control module on the wellhead.

FIG. 3 illustrates a detailed view of a contactless power transfer system according to an embodiment of the invention. The contactless power transfer system 56 that is part of the power coupling unit as described in FIG. 2 comprises a primary element 60 disposed within a cavity 76 on the first component 38 such as a tubing hanger. A secondary element 64 is disposed within a cavity 78 on the second component 40 such as a tree head. A magnetic shield, for example, the inner walls of the cavities 76, 78 is configured as a shield such that there is magnetic/electrical/electrostatic shielding between the elements hosted with the cavities 76, 78 and the external environment such as sub-sea tubing components. The cavities further include a non-conducting and non-magnetic partition such as 80, 82 disposed respectively on the first component 38 and the second component 40 between the primary element 60 and the secondary element 64. Non-limiting examples of non-conducting and non-magnetic materials that can be implemented in the cavities include ferrite and related materials.

At least one field-focusing element 66 is interposed between the primary element 60 and the secondary element 64 and configured to focus a magnetic field. The field-focusing element may include a plurality of resonators. In one embodiment, the resonators are configured to comprise at least two sets of unique resonant frequencies. In a more specific embodiment, between the two sets of resonant frequencies, the first resonant frequency may be configured to transfer power and the second resonant frequency may be configured to transfer data. Further details of contactless power transfer systems in general and field-focusing elements in particular can be found in co-pending U.S. patent application Ser. No. 12/731,497, filed on Mar. 25, 2010, entitled "CONTACTLESS POWER TRANSFER SYSTEM AND METHOD."

A pressure casing 68 configured as a pressure isolation element in the embodiment of FIG. 3 includes seals 70, 73 and pressure isolation cap 80 to isolate high pressure within the well-bore environment and cavity 76. Similarly, seals 72 and 74 and pressure isolation cap 82 are disposed around pressure casing 69 to isolate high pressure within the well-bore environment and cavity 78. Non-limiting examples of pressure isolation cap material include non-magnetic materials, insulating materials, and non-porous materials.

In one embodiment, the primary element 60 is coupled to a power source (not shown) hosted on the control module 18 as referenced in FIG. 1. The secondary element 64 is coupled to a load disposed within the well bore. In one embodiment the load includes sensors are configured for sensing at least one parameter such as, for example, temperature or pressure within the well-bore. The contactless power transfer system is configured to transfer power from the power source coupled to the primary element 60 to the sensors coupled to the secondary element 64 via the field-focusing element 66. In certain embodiments bi-directional transfer occurs such that data is transferred simultaneously from the sensors to the control module 18 while power is being transferred from the power source to the sensors. The load may additionally or alternatively include actuators based on electrical drives, the holding power needed in magnetic bearing applications, and subsea control and monitoring systems, for example. The primary element 60 and the second element 64 are substantially aligned for most efficient contactless power transfer. However, in the presently contemplated embodiments, misalignments, such as up to several millimeters laterally and/or several degrees radially, are more tolerable than in conventional embodiments.

Referring to FIGS. 1 and 3, multiple contactless power transfer systems such as 56 may be implemented between the sub-sea distribution unit 12 and the satellite wellhead systems 16, 24, 26. Furthermore, within a wellhead system, for example, wellhead 24 may include one or more contactless power transfer system for exchanging power and data between the power source and sensors within the well-bore. An example of cascaded contactless power transfer system includes coupling a first sub-sea distribution unit such as referenced by numeral 12 to a second sub-sea distribution unit 13. Furthermore, such second sub-sea distribution unit 13 may be coupled to one or more satellite wells (not shown) for power and data transfer.

Figure 4:
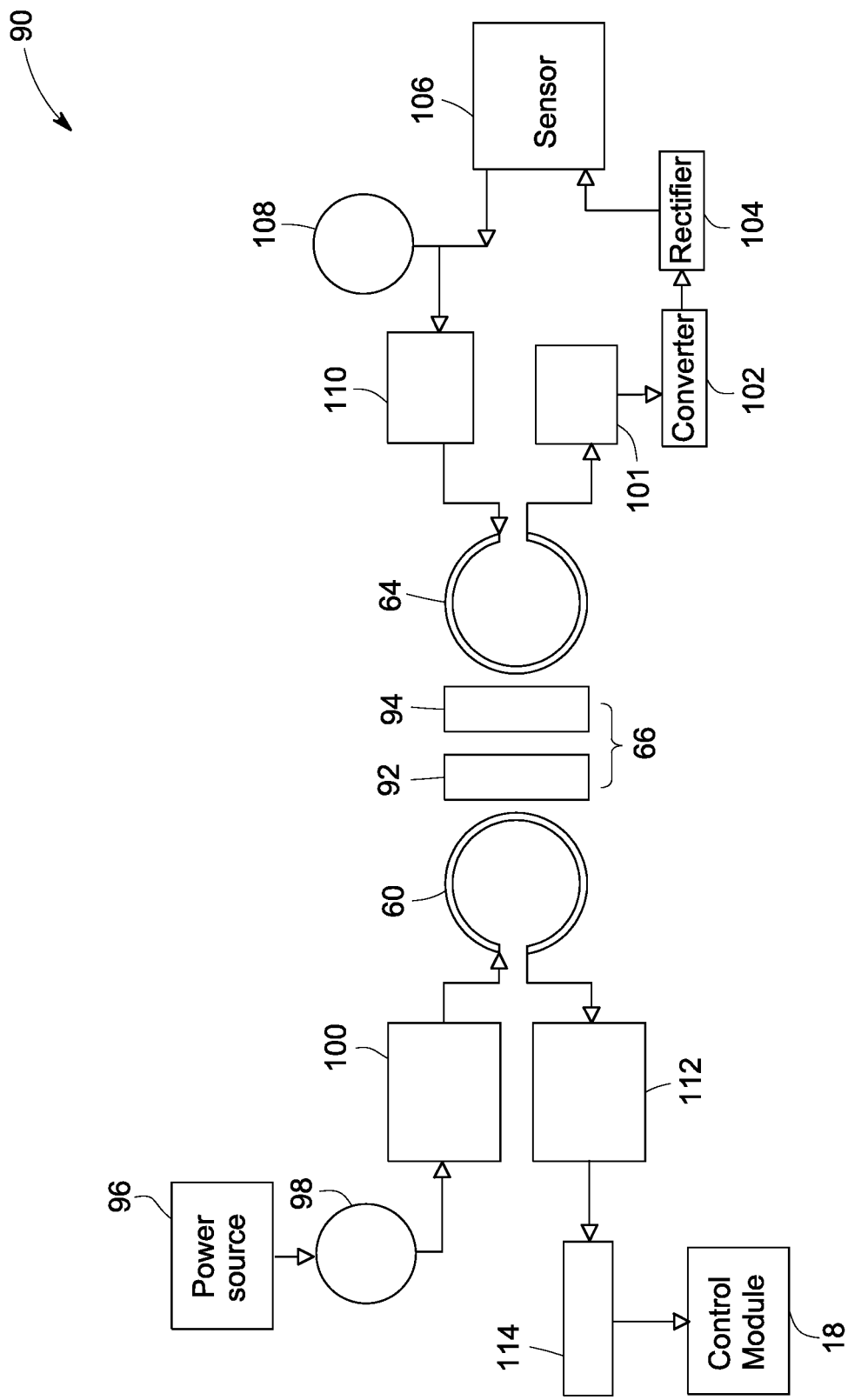
FIG. 4 illustrates a detailed block diagram of the contactless power transfer system hosted within the cavities of a sub-sea component according to an embodiment of the invention.

FIG. 4 illustrates a detailed block diagram of the contactless power transfer system hosted within the cavities of a sub-sea tubing component according to an embodiment of the invention. The contactless power transfer system 90 includes a primary element 60, a secondary element 64 and a field-focusing element 66. In the specific embodiment of FIG. 4, the field-focusing element 66 includes a first field-focusing element 92 disposed proximate the primary element 60 and a second field-focusing element 94 disposed proximate the secondary element 64. The first and second field-focusing elements 92, 94 may each comprise multiple resonators or a single resonator. Field-focusing elements 92, 94 are configured for operating at two different resonant frequencies and to focus a magnetic field to couple the primary element 60 and the secondary element 64. A power source 96 and an inverter 98 are coupled to the primary element 60 via a first filter 100. In one embodiment, filter 100 has a band pass response such that the resonance frequency of first resonator lies within 3 dB of bandwidth of band pass filter. In one embodiment, the power source 96 may be configured to generate DC power that is converted to the frequency of resonance of first resonator, and the first resonator may resonate at frequencies of several tens of kHz to several tens of MHz. The first filter 100 is configured to pass such high frequency power (and block other frequencies) from the inverter 98 to the primary element 60.

As discussed earlier, the field-focusing element 66 may include one set of resonators, for example, first field-focusing element 92 may be configured for resonating at a first resonant frequency corresponding to the power frequency from the inverter 98. Such a tuned resonator by design and structure helps focus a magnetic field from the primary element 60 onto the secondary element 64 resulting in efficient power transfer even with an air gap in the range of about 1 centimeter to about 10 centimeters. A first receiving filter 101 and a first receiving converter 102 coupled to the secondary element 64 respectively filter and convert high frequency power to lower frequency power. First receiving filter 101 further blocks frequencies different from the first resonant frequency. In one embodiment, first receiving converter 102 demodulates the power received from the power source. A rectifier 104 coupled to the receiving converter 102 is configured to supply DC power to a load such as the sensor 106.

Sensors 106 may include a plurality of individual sensors or an aggregation of multiple transducers. For purposes of example a single sensor 106 is illustrated. However, many such sensors may be coupled to the secondary element 64. Sensors 106 require power to operate and sense at least one parameter such as temperature or pressure. Such sensors are designed to withstand high pressure and temperatures as they may be disposed in environments such as well-bores. Apart from receiving power, sensors 106 are configured to transmit data such as sensed pressure or temperature that is required for purposes of controlling the operations of oil drilling.

A second inverter 108 is coupled to the sensor 106 and configured to convert/modulate the data signals into a high frequency data signal. A second filter 110 passes the high frequency data signals (and block other frequencies) to the secondary element 64. A second field-focusing element 94 is configured to resonate at a second resonant frequency different from the first resonant frequency such that magnetic field from the secondary element 64 is focused on to the primary element 60. A second receiving filter 112 and a second receiving converter 114 correspondingly filter and convert the high frequency data signals into a readable frequency range that can be handled by the control module 18. Second receiving filter 112 blocks frequencies other than the second resonant frequency signals.

In addition to providing power or data transfer, contactless power transfer system 90 may further be used to provide voltage transformation such as, for example, for reducing a voltage from primary element to secondary element. It may be appreciated that such voltage transformation is possible by varying the number of turns on the primary and the secondary elements. Furthermore, in certain embodiments a voltage regulation module may be integrated with the contactless power transfer system 90 such that voltage regulation is provided for any voltage change with respect to loads such as actuators.

In an exemplary embodiment, it is advantageous to have an integrated sensor for example, comprising the second filter 110, second inverter 108, first receiving filter 101, first receiving converter 102, and rectifier 104 integrated within the sensor 106. In certain embodiments, that have a space constraint within the cavities of the tubing components some of the electronics such as the second filter 110, second inverter 108, first receiving filter 101, first receiving converter 102, and rectifier 104 may be hosted on the control module 18 having communication with the sensors 106 in the well bore.

Advantageously, contactless power transfer systems as disclosed in various embodiments above have compact designs as compared to the inductive power transfer systems. A compact design enables larger power transfer capabilities within a given space. Implementing field-focusing elements enhances coupling between primary and secondary elements with higher efficiency for larger gaps. Further, such systems are robust to variations in the load without much sacrifice to the efficiency. Further, the field-focusing elements are designed for field channeling/focusing at at-least two distinct frequencies. Such multiple frequency bands can be utilized to transfer power and data signals independently across a common field element. Contactless power transfer systems enable wet-mate connections to disconnect without turning off the main power. This enables continuous power supply without disruption of production for an entire field during a localized fault at one well.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a contactless power transfer system comprising a primary element, a secondary element, and at least one field-focusing element interposed between the primary element and the secondary element and configured to focus a magnetic field;
a partition disposed between the primary element and the secondary element,
wherein the contactless power transfer system is disposed within pressure isolation cavities of a sub-sea assembly and configured to transfer power between a power source and a load.

2. The system of claim 1, wherein the contactless power transfer system is disposed within a non-conducting magnetic shield.

3. The system of claim 1, wherein the partition comprises a non-magnetic and non-conducting material.

4. The system of claim 1, wherein the primary element is coupled to the power source and the secondary element is coupled to the load.

5. The system of claim 1, wherein the contactless power transfer system is configured to exchange data between the load and the power source.

6. The system of claim 1, wherein the field-focusing element comprises one or more resonators.

7. The system of claim 6, wherein the field-focusing element comprises at least two unique resonant frequencies.

8. The system of claim 7, wherein one of the resonant frequencies is configured to transfer power and another of the resonant frequencies is configured to transfer data.

9. The system of claim 1, wherein the contactless power transfer system further provides a voltage transformation between the primary element and the secondary element.

10. The system of claim 1 further comprising a plurality of contactless power transfer systems coupled in cascade to transfer power.

11. A system comprising:
a contactless power transfer system disposed within pressure isolation cavities comprising
a primary element,
a secondary element,
a first field-focusing element disposed proximate the primary element, and
a second field-focusing element disposed proximate the secondary element,
the first and second field-focusing elements being configured for operating at two different resonant frequencies to focus a magnetic field and exchange power between the primary element and the secondary element.

12. The system of claim 11, further comprises non-conducting and magnetically shielded cavities to host the contactless power transfer system.

13. The system of claim 11, wherein the primary element is coupled to a power source and control module and configured to exchange power and data.

14. The system of claim 11, wherein the secondary element is coupled to a load and configured to exchange power and data.

15. A contactless power transfer system comprising:
a primary element;
a power source and a first filter coupled to the primary element and configured to transmit power at a first resonant frequency;
a secondary element;
a first converter and a rectifier coupled to the secondary element and configured to deliver power to a load;
one or more sensors and second filters coupled to the secondary element and configured to sense at least one parameter and transmit data at a second resonant frequency;
at least two field-focusing elements interposed between the primary element and the secondary element, a first field-focusing element configured for transmitting power at the first resonant frequency and a second field-focusing element configured for transmitting data at the second resonant frequency; and
a second converter coupled to the primary element to receive data from the one or more sensors.

16. The contactless power transfer system of claim 15, wherein the power source is further coupled to an inverter.

17. The contactless power transfer system of claim 16, wherein the inverter modulates the power from the power source.

18. The contactless power transfer system of claim 17, wherein the first converter demodulates the power received from the power source.

19. The contactless power transfer system of claim 15, wherein the load comprises one or more sensors to sense a plurality of parameters within a well bore.

20. The contactless power transfer system of claim 15, wherein each of the at least two or more field-focusing elements comprises a plurality of resonators.

* * * * *